March 17, 1953    M. E. TODD    2,631,362
ARMATURE ASSEMBLING MACHINE
Filed Oct. 10, 1947    10 Sheets-Sheet 3

Fig. 5

INVENTOR.
Max E. Todd
BY
Spencer Hardman & Fehr
his attorneys

March 17, 1953 M. E. TODD 2,631,362
ARMATURE ASSEMBLING MACHINE
Filed Oct. 10, 1947 10 Sheets-Sheet 6

INVENTOR.
Max E. Todd
by Spencer Hardman & Fehr
his attorneys

March 17, 1953 M. E. TODD 2,631,362
ARMATURE ASSEMBLING MACHINE
Filed Oct. 10, 1947 10 Sheets-Sheet 7

INVENTOR.
Max E. Todd
BY Spencer Hardman & Fehr
his attorneys

March 17, 1953 M. E. TODD 2,631,362
ARMATURE ASSEMBLING MACHINE
Filed Oct. 10, 1947 10 Sheets-Sheet 8

INVENTOR.
Max E. Todd
BY Spencer Hardman & Fehr
his attorneys

March 17, 1953 M. E. TODD 2,631,362
ARMATURE ASSEMBLING MACHINE
Filed Oct. 10, 1947 10 Sheets-Sheet 9

INVENTOR.
Max E. Todd
BY
Spencer Hardman & Fehr
his attorneys

March 17, 1953            M. E. TODD            2,631,362

ARMATURE ASSEMBLING MACHINE

Filed Oct. 10, 1947            10 Sheets—Sheet 10

INVENTOR.
Max E. Todd
BY Spencer Hardman & Fehr
his attorneys

Patented Mar. 17, 1953

2,631,362

UNITED STATES PATENT OFFICE 2,631,362

ARMATURE ASSEMBLING MACHINE

Max E. Todd, Anderson, Ind., assignor to General Motors Corporation, Detroit, Mich., a corporation of Delaware Application October 10, 1947, Serial No. 779,045

4 Claims. (Cl. 29—205)

This invention relates to the manufacture of armatures with a single turn bar winding known as "hairpins."

An object of the invention is to provide a machine of a relatively simple construction for facilitating the assembly of the hairpins with the core of an armature. The machine provides a stationary upper support and the vertically movable lower support which carries a workholder adapted to receive a nesting member for an armature core assembled with its shaft. The nesting member which has been manually loaded with hairpins in nesting relation is placed upon the workholder, and the lower support is elevated toward the upper support where fingers are caused to move radially in toward the hairpins to hold them in nesting relation independently of the nesting device on the lower support. The lower support is then moved down carrying with it the empty nesting device. The nesting device is removed from the lower support and an armature core is placed in the workholder of the lower support. The lower support is elevated to cause the lower ends of the hairpins to enter into the core slots. The ram located above the upper support is caused to move down to push the hairpins through the core slots. Just before the ram engages the hairpin yokes, the lower support is automatically latched in upper position by members which take the thrust of the ram upon the hairpins. Concurrently with the downward movement of the ram the fingers of the upper support are retracted so that the ram is free to push the hairpins through the core. Then the ram is elevated and concurrently the lower support is unlatched. The lower support moves down and the armature core assembled with hairpins is removed from the workholder of the lower support.

Further objects and advantages of the present invention will be apparent from the following description, reference being had to the accompanying drawings wherein a preferred embodiment of the present invention is clearly shown.

In the drawings:

Figs. 6-A and 6-B are sectional views on the line 6—6 of Fig. 1 and show the parts in different positions;

Figs. 7-A and 7-B are fragmentary views looking in the direction of arrow 7 of Fig. 6-A and 6-B showing the parts in different positions;

Fig. 17 (left half) shows the lower support carrying the armature core in elevated position with the ram starting to engage the hairpins;

Fig. 17 (right half) is a similar view showing the ram moving down to force the hairpins through the armature core;

Figure 1:
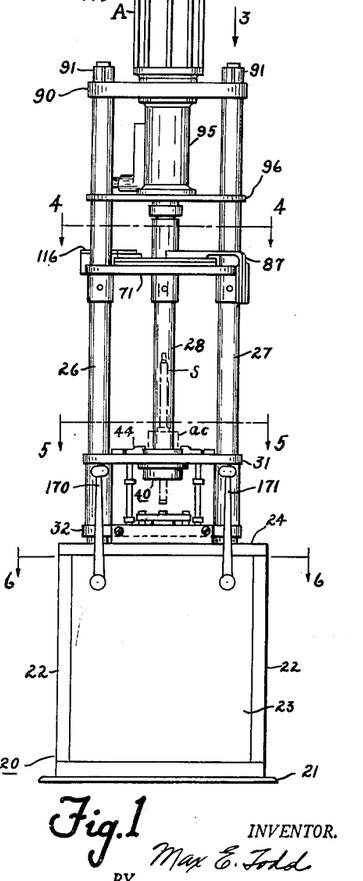
Fig. 1 is a front view of the machine.

Referring to Fig. 1, the machine comprises a boxlike frame 20 which includes a base 21, sides 22, front panel 23 and a top 24.

Figure 2:
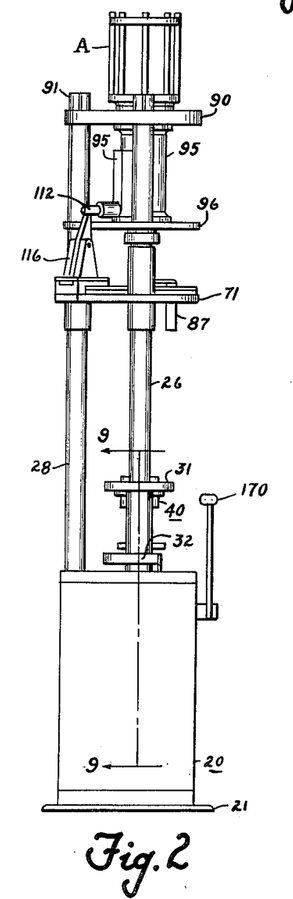
Fig. 2 is a side view looking in the direction of arrow 2 of Fig. 1.
Figure 3:
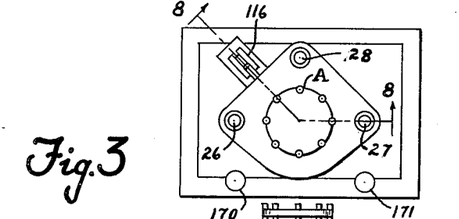
Fig. 3 is a top view looking in the direction of arrow 3 of Fig. 1.
Figures 9, 10:
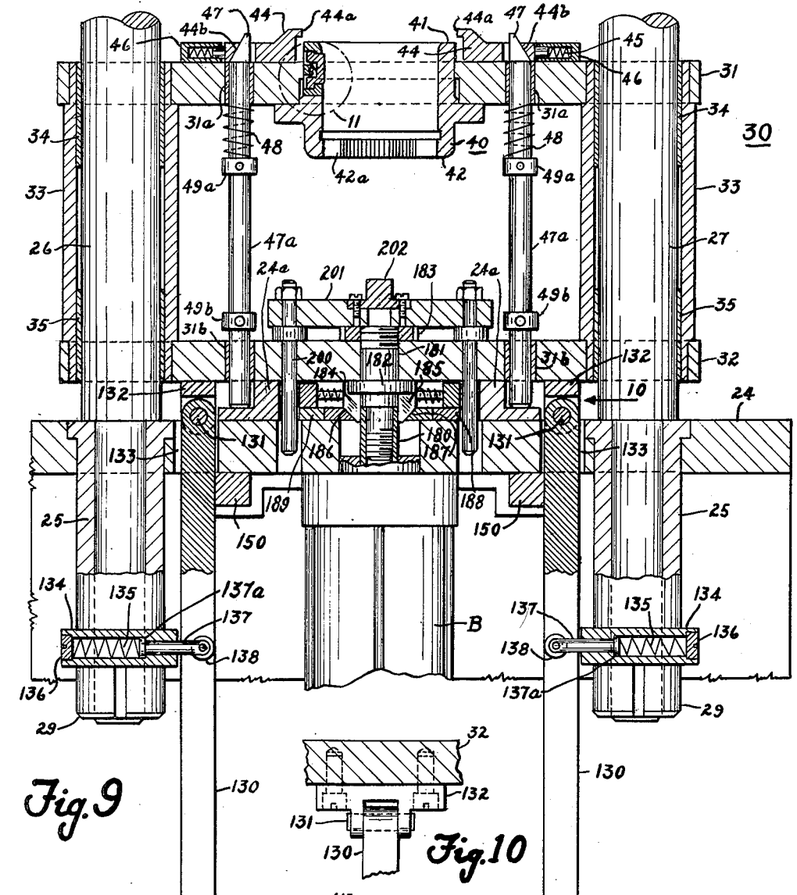
Fig. 9 is a sectional view on the line 9—9 of Fig. 2.
Fig. 10 is a fragmentary view looking in the direction of arrow 10 of Fig. 9.

Referring to Fig. 9, the top 24 supports bushings 25 for receiving respectively rods or posts 26, 27 and 28 (Figs. 1, 2 and 3) which are secured at the bottom by nuts 29 (Fig. 9). Posts 26 and 27 serve as guides for a vertical movable lower support 30 comprising plates 31 and 32 connected by sleeves 33 provided with bearings 34 and 35 which slide on these posts. The support 30 is raised and lowered by a piston in a cylinder B supported by table 24, the piston being connected with a rod 180 (Fig. 9) threadedly engaged by rod 181 whose shoulder 182 receives the lower side of plate 32. Rod 181 receives a nut 183 engaging the upper side of plate 32.

Figure 12:
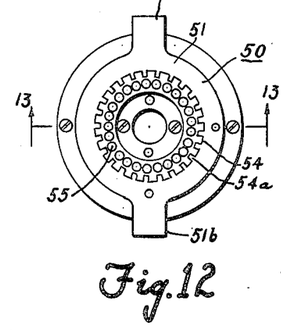
Fig. 12 is a plan view of the nesting device.
Figure 13:
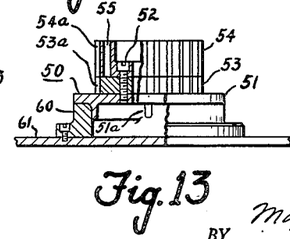
Fig. 13 is a sectional view on the line 13—13 of Fig. 12.
Figure 14:
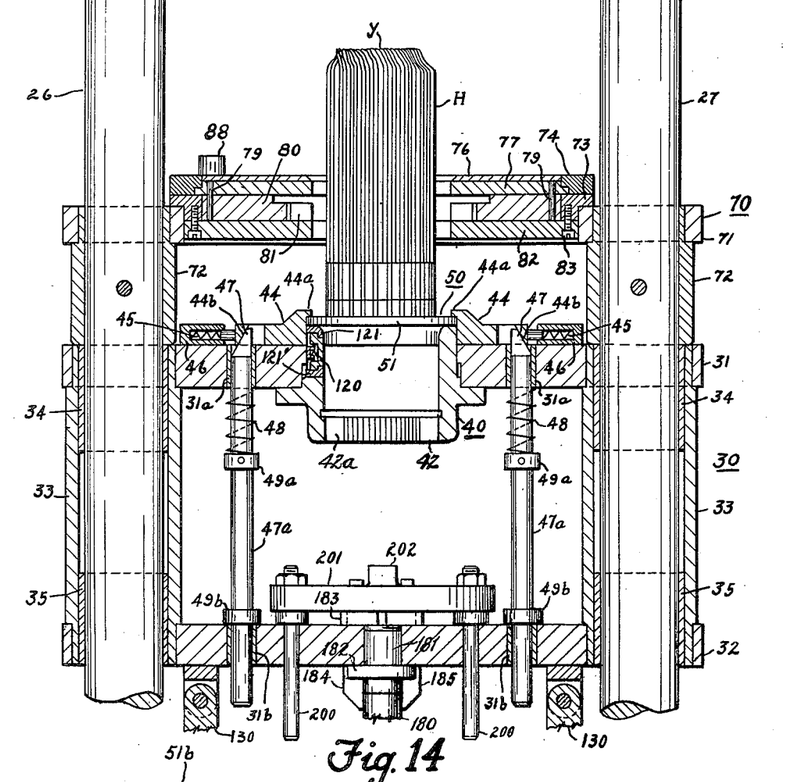
Fig. 14 is a vertical longitudinal sectional view showing a nesting device supported upon a receptacle of the lower support and the lower support elevated to the upper support through which the hairpins extend.
Figure 15:
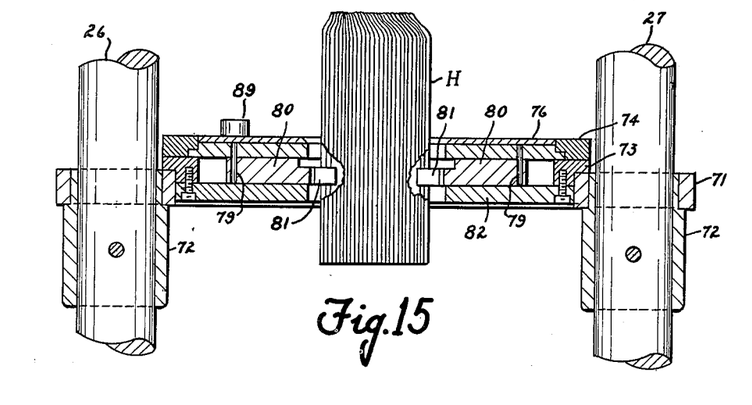
Fig. 15 is a vertical longitudinal sectional view showing the hairpins engaged by fingers on the upper support.
Figure 16:
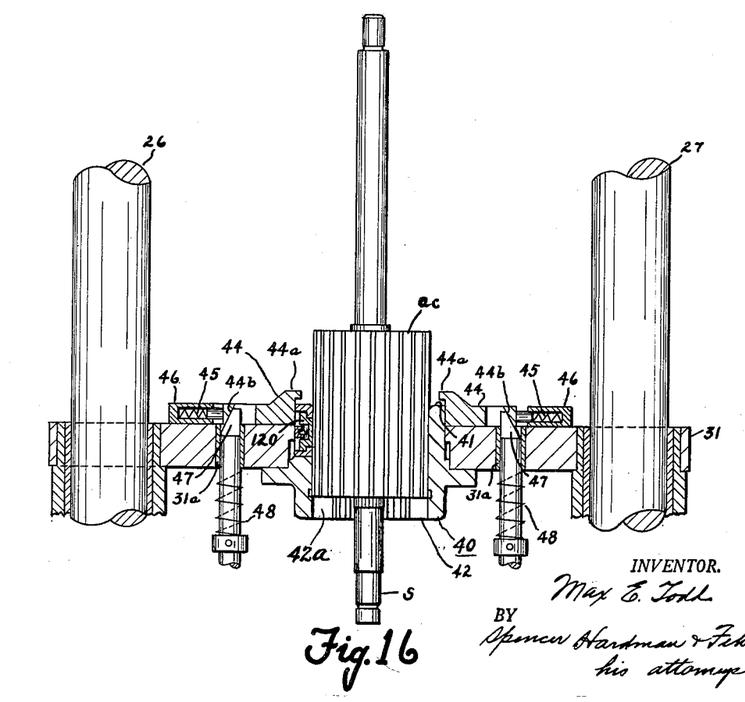
Fig. 16 is a vertical longitudinal sectional view showing the core within the receptacle of the lower support.

The upper plate 31 supports a workholder 40 having a top surface 41 for supporting a nesting device 50 (Figs. 12 and 13) as shown in Fig. 14 and the workholder provides a radially notched flange 42 (see also Fig. 5) which supports an armature core *ac* assembled with a shaft S (Fig. 16). The notches 42a receive the branches of the hairpins H to be assembled with the core.

Figure 5:
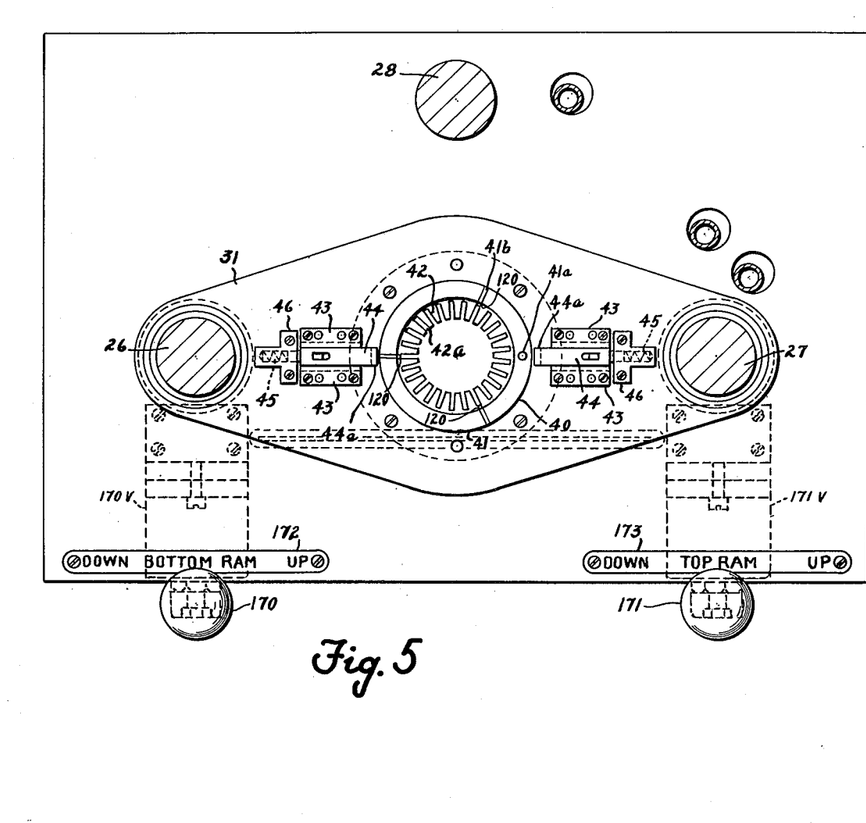
Fig. 5 is a sectional view on the line 5—5 of Fig. 1.

Referring to Fig. 5, plate 31 supports guides 43 for latch bars 44 which are urged toward each other by springs 45 retained within brackets 46. Bars 44 have lugs 44a which will extend over the nesting device 50 when the lower support 30 is elevated. Normally the bars 44 are retracted as shown in Fig. 5 by reason of location of the cam blocks 47 which engage surface 44b of bars 44 when the lower support 30 is down. In this case the rods 47a which provide the cams 47 are bottomed on members 24a attached to plate 24. The rods slide in bushings 31a and 31b provided respectively by plates 31 and 32. When the lower support 30 moves up, as shown in Fig. 14, springs 48 are permitted to expand and push down on collars 49a attached to the rods until collars 49b attached to the rods strike the plate 32. Then the nesting member 50 is latched upon the workholder 40.

Nesting member 50 comprises a base 51 to which screws 52 attach a disc 53 having grooves 53a and a disc 54 having grooves 54a in alignment with the grooves 53a and holes 55 in radial alignment with the notches. Fig. 14 shows in its upper position the nesting device 50 loaded with hairpins H, the parallel branches of which are in alignment with the notches 42a of flange 42 (Figs. 5 and 14). The nesting device 50 is loaded (as shown in Fig. 14) when resting upon a ring 60 located on a suitable support 61. The extensions 51b of the plate 51 serve as handles by which the nesting device loaded with hairpins can be lifted and placed upon the workholder 40 when the lower support 30 is down, as shown in Fig. 9. The nesting device 50 is located by a pin 51a attached to plate 51 and received by a hole 41a drilled through the surface 41 of the workholder 40. By admitting pressure fluid to the lower end of the cylinder B, lower support 30 moves the nesting device loaded with hairpins H into the position shown in Fig. 14; and, during upward movement of support 30 the latch bars 44 are permitted to move inwardly to cause their lugs 44a to extend over the flange 51 and thus hold the device 50 upon the receptacle 40.

Figure 4:
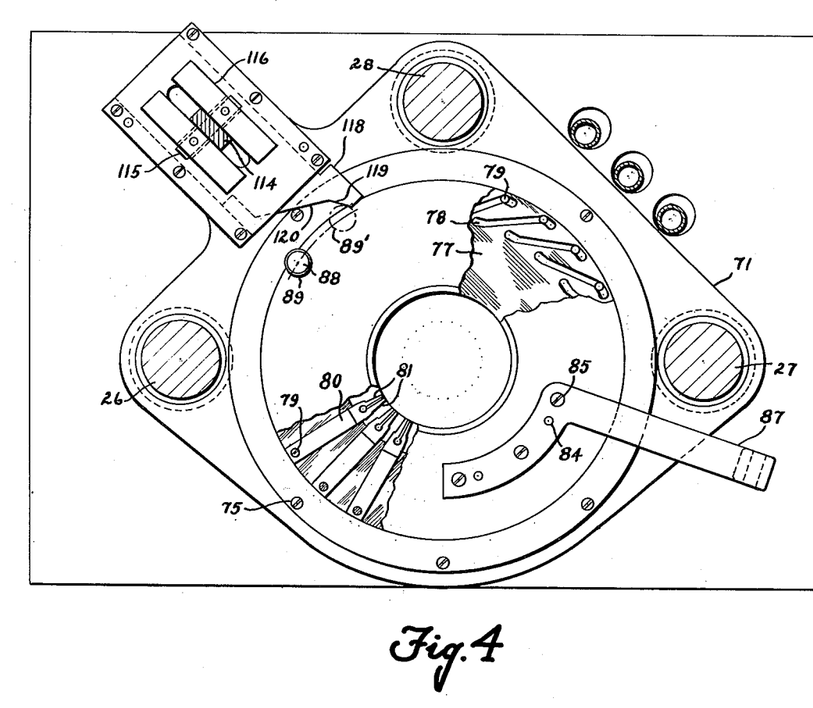
Fig. 4 is a sectional view on the line 4—4 of Fig. 8.
Figure 8:
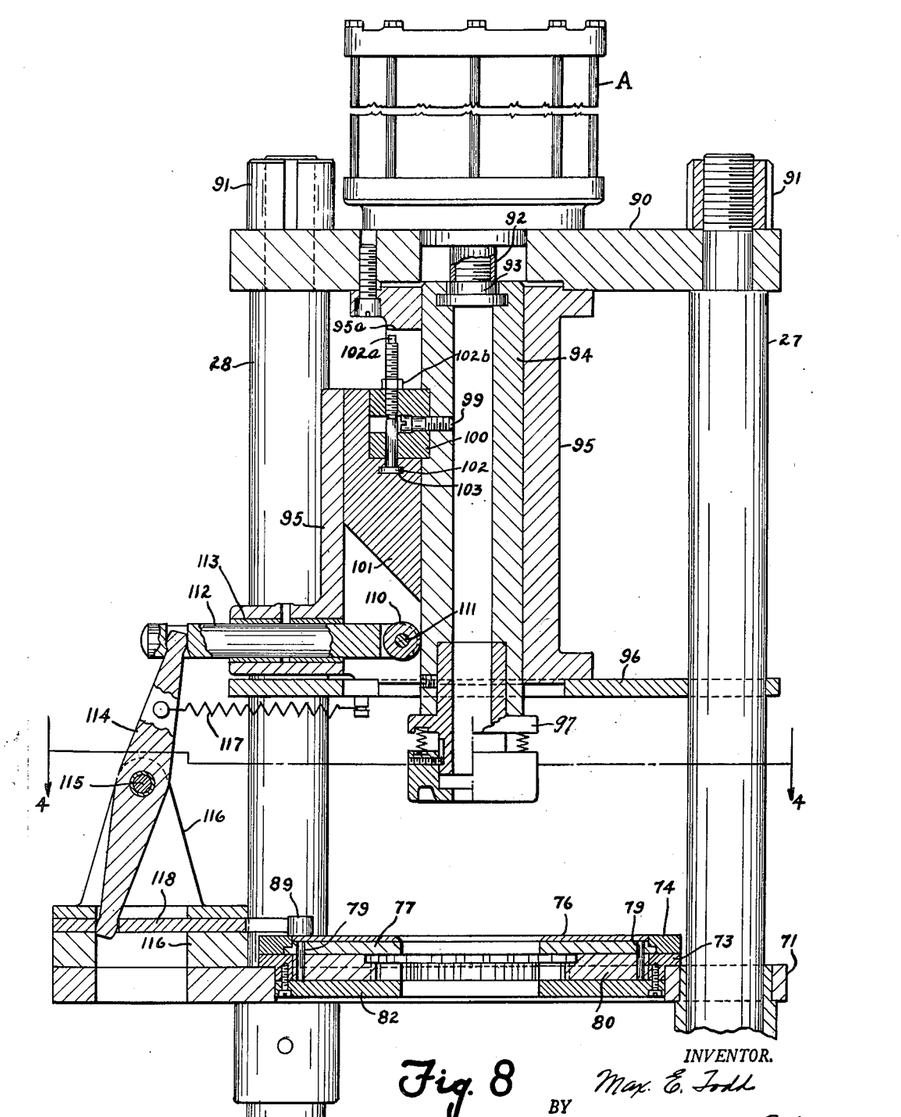
Fig. 8 is a sectional view on the line 8—8 of Fig. 3.
Figure 11:
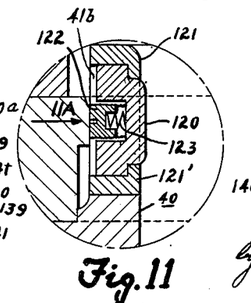
Fig. 11 is an enlargement of that portion of Fig. 9 included in the dot-dash circle 11.
Figure 11A:
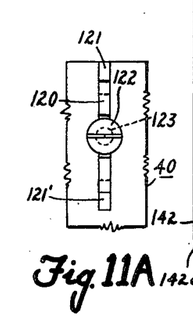
Fig. 11A is a fragmentary view in the direction of arrow 11A of Fig. 11.
Figure 18:
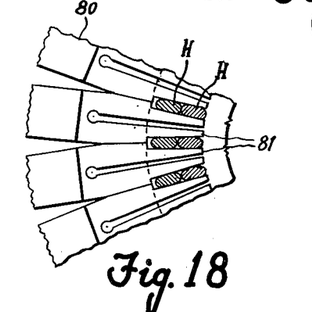
Figs. 18 and 19 drawn to a larger scale than Fig. 17, are fragmentary sectional views on the line 18—18 of Fig. 17, showing respectively the fingers on the upper support engaging the hairpins and the fingers out of engagement with the hairpins.
Figure 19:
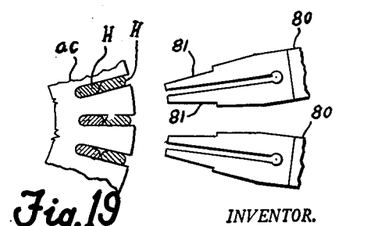

In Fig. 14, the hairpins H extend through a central opening in the upper support 70 which comprises a plate 71 attached to bushings 72 pinned on the rods 26, 27 and 28. The plate 71 has a circular opening which receives a ring 73 which supports above it a ring 74 with screws 75 (Fig. 4) which attach to the ring 73. Within the ring 73 there are located a cover plate 76 and a cam plate 77 which, as shown in Fig. 4, is provided with cam slots 78, each for receiving a pin 79. Each pin 79 is attached to a bar 80 which is notched at its inner end to provide resilient fingers 81. The bars 80 are guided by radial grooves provided by a plate 82 which screws 83 attach to ring 73. The cover plate 76 is connected with the cam plate 77 by dowel pins 84 and screws 85 which connect an arcuate plate with the cam plate 77. The arcuate plate provides a handle 87. There is also connected with the cam plate 77 a stud 88 pivotally supporting a roller 89. When the handle 87 is in the position shown in Fig. 4 the bars 80 will be retracted as shown in Fig. 4 and Fig. 19. By turning the handle 87 and plate 77 clockwise from the position shown in Fig. 4, the bars 80 move inwardly as shown in Fig. 18, so that they will frictionally engage the branches *h* of the hairpins H and will maintain them in the same positions as determined by the nesting device 50. The device 50 is then lowered by admitting pressure fluid to the top end of the cylinder B which causes the lower support 30 to return to the position shown in Fig. 9. The nesting device 50 is then removed from the workholder 40 and an armature core *ac* (Fig. 16) is placed therein. The core *ac* is properly located in the workholder by virtue of engagement of core teeth with locators 120 (Fig. 11) which are movable in radial slots at 41b and between L-shaped members 121 and 121' (Fig. 11) welded to the workholder. Springs 123 urge the locators 120 inwardly against the members 121 and 121', said springs 123 being retained by plugs 122 threaded in to the workholder (also Fig. 11A). Then, pressure fluid is admitted to the lower end of cylinder B to cause the lower support 30 to move into the position shown in Fig. 17. The core *ac* is lifted far enough to receive just the lower end portions of the hairpin bars H. Then pressure fluid is admitted up in the top end of the cylinder A which, as shown in Fig. 8, is supported by a plate 90 supported by the posts 26, 27 and 28 (Fig. 3) and retained by nuts 91. The piston rod 92 attached to a piston within cylinder A is connected by coupling 93 with a tubular ram 94 guided by a bracket 95 attached to the plate 90 and supporting a plate 96 through which the posts 26, 27 and 28 extend. The ram 94 supports a ram head 97 having an annular groove 98 for engaging the yokes *y* of the hairpins H (Fig. 14). A screw 99 connects a block 100 with ram 94. Block 100 is connected with a cam 101 by the head of a screw 102 received by T slot 103 in cam 101 and threaded in block 100. By a wrench applied to its square end 102a, the screw 102 can be turned to raise or lower the cam 101 to adjust it relative to the roller 110. The cam 101 is locked in the desired position by tightening a lock nut 102b.

Figure 17:
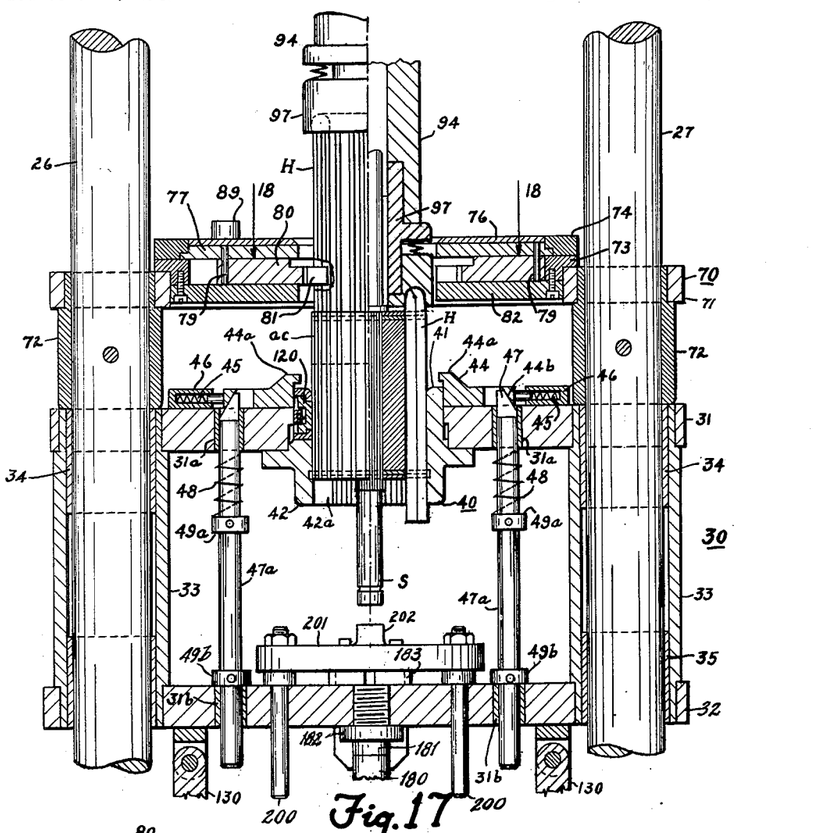

During downward movement of ram 94, the head 97 engages the hairpin yokes *y* in order to force the hairpins H down through the slots of the armature core *ac* as indicated in the right half of Fig. 17. The lower ends of these hairpins extend down through the notches 42a of the flange 42 of workholder 40. However before the head 97 can pass through the plane of fingers 80, it is necessary to retract them. This is accomplished automatically by the engagement of cam 101 with a roller 110 pivotally supported on a pin 111 carried by a bar 112 guided in the bearing 113 provided by a bracket 95. As the cam 101 moves down, the rod 112 moves left, thereby moving counterclockwise a lever 114 pivoted on a rod 115, supported by a bracket 116 mounted on the plate 71. This motion of lever 114 is resisted by a spring 117 connected with the lever and the plate 96. As the lever 114 moves counterclockwise it pushes to the right a bar 118 guided by a bracket 116 and having cam surfaces 119 and 120 (Fig. 4) which engage the roller 89 connected with cam plate 77 when said roller is at position 89' to which position it has been moved when the plate 77 had been manually rotated counterclockwise in order to cause the bars 80 to move inwardly to grasp the hairpin bar H, as shown in Fig. 17. During downward movement of ram 94 the cam 118 moves in to cause the roller 89 to move from the position indicated at 89' in dot and dash circle to the full line position 89 thereby returning the cam plate 77 to its original position which causes the finger bars 80 to move out, as shown in Fig. 19.

During downward movement of the ram to force the hairpins through the armature core it is desirable to support the core by means other than the fluid pressure underneath the piston and cylinder B which holds the support 30 up. This additional support is provided through the medium of bars 130 (Fig. 9) pivotally supported on pins 131 carried by bracket 132 fastened to the under side of the plate 32. Bars 130 extend through openings 133 which allow the bars to swing on their pivots slightly. The nuts 29 (Fig. 9) clamp plates 134 against the lower ends of bushings 25. Each plate 134 houses a spring 135 retained by a plug 136 and urging to the right a plunger 137 carrying a roller 138 until the head 137a of the plunger strikes a shoulder in the plate 134. To the lower end of each bar 130 screws 139 attach a plate 140 having a beveled surface 140a which may contact the roller 138 when the plate 140 moves up when the lower support 30 is elevated. Therefore the roller 138 which then engages the plate 140 would hold the bar 130 practically perpendicular and against the side of a lever 150, the function of which is to be described. Screws 141 attach to the lower end of each bar 130, a wear piece or latch plate 142 having a stop surface 142a which, if the bar 130 were swung toward the plate 134, would ride over the top surface of plate 134. In such case downward thrust upon the lower support 30 while the hairpins are being forced through the core by the ram would be transmitted from the lower support through the bars 130 and their latch plates 142 to the plate 134 and then through the nut 29, posts 26, 27 to the plate 24, and thence to the base of the machine. When the lower support 30 is elevated the first time to move the nesting device 50 containing the hairpins H immediately following this operation there is no thrust upon the hairpin H. Therefore, there is no occasion for causing the bars 130 to swing toward the plates 134. However, following the second upward movement of the support 30 which is followed by downward movement of the ram it is desirable to cause the bars 150 to push the bars 130 toward the plates 134 before the ram begins to engage the hairpins. To accomplish this the valve which controls the admission of pressure fluid to the upper end of the cylinder A also causes pressure fluid to flow into the left end of the cylinder C (Fig. 6A) which is supported on the underside of plate 24 by screws 151. As the piston in cylinder C moves right its rod 152 moves a plate 153 having a slot 154 receiving a pin 155. This causes movement of a toggle member 156 supporting the pin 155 from the position shown in Fig. 6A to that shown in Fig. 6B, thereby tending to straighten the toggle link provided by parts 156 attached by pins 158 to a lever 159 and the link 159 connected by pin 160 with member 156 and connected by pin 161 with the other lever 150. The levers 150 are pivoted on pins 162 and are supported vertically by brackets 163 which screws 164 attach to the lower side of plate 24. Thus when the piston rod 152 moves right, the levers 150 move toward the bushings 25 at the time the lower support 30 is up. The plate 140 on the lower end of each bar 130 therefore moves from the position shown in Fig. 7A to that shown in Fig. 7B against the action of a spring 135, and the surface 142a of the latch plates 142 moves over the top surface of the plate 134. Therefore, while the ram is pressing the hairpins through the armature core the thrust upon the lower support is transmitted through the bars 130 to the plates 134.

Figures 6A, 7A:
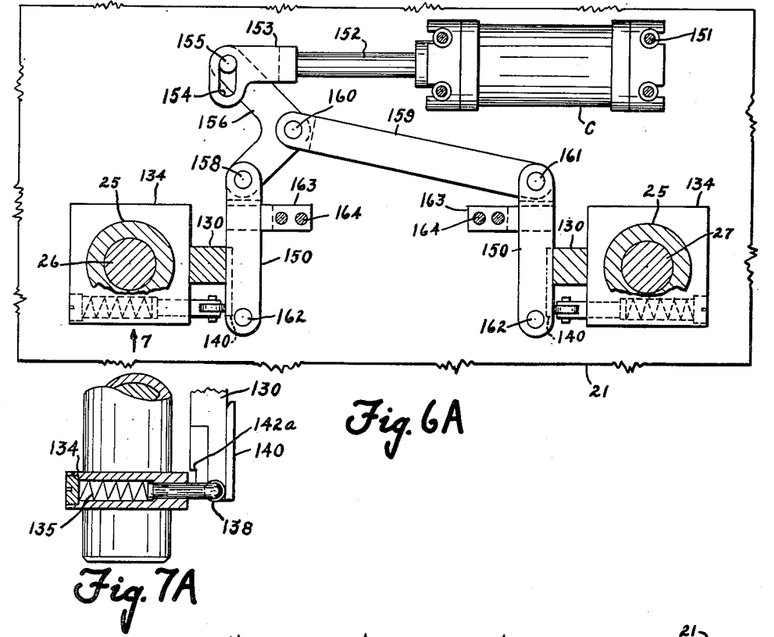
Figures 6B, 7B:
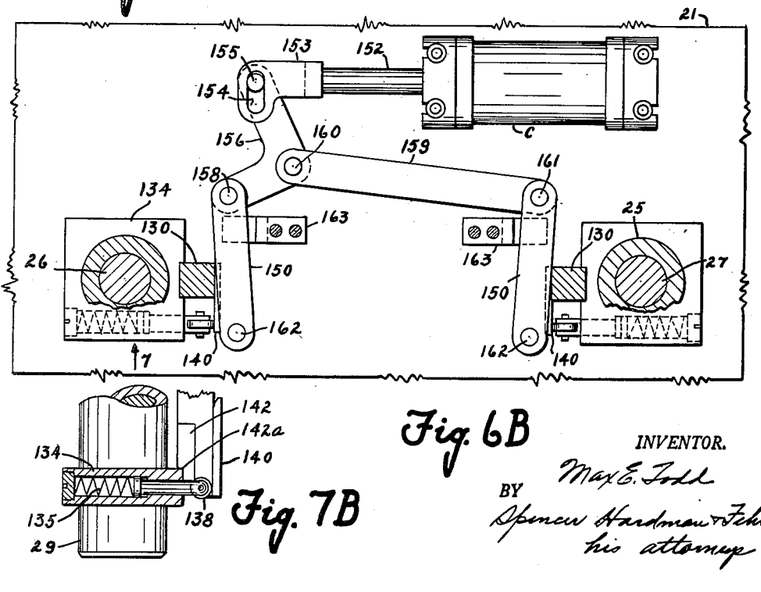

When pressure fluid is admitted to the lower end of the cylinder A for the purpose of elevating the ram after the operation of forcing the hairpins through the core, pressure fluid is concurrently supplied to the right end of the cylinder C to cause the parts connected with the piston rod 152 to move from the positions shown in Fig. 6B to the positions shown in Fig. 6A whereupon the levers 150 move toward each other and the springs 135 push the plates 140 and the bars 130 toward each other so that the latching surfaces 142a of the plates 142s are clear of the plates 134. Then the pressure fluid is admitted to the upper end of the cylinder B to cause the lower support to move down carrying with it the assembled core and hairpins which are then removed from the workholder 40.

The pressure fluid circuits are not shown but it will be understood that the admission of pressure fluid to the ends of the lower cylinder B is controlled by lever 170 (Figs. 1 and 5) and that the admission of pressure fluid to the ends of the cylinders A and C is controlled by a lever 171 which operates a valve 171V. Plates 172 and 173 (Fig. 5) attached to table 24 bear legends which indicate respectively the direction which levers 170 and 171 are to be moved.

Figure 20:
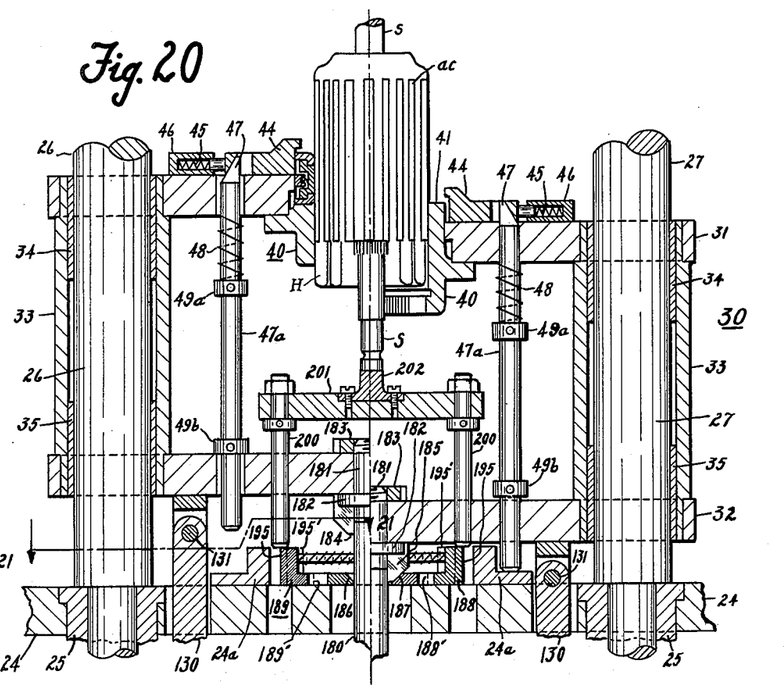
Fig. 20 (left half) and Fig. 20 (right half) show, respectively, the beginning and the ending of the operation of stripping the workholder from the hairpins assembled with the armature.
Figures 21, 22, 23:
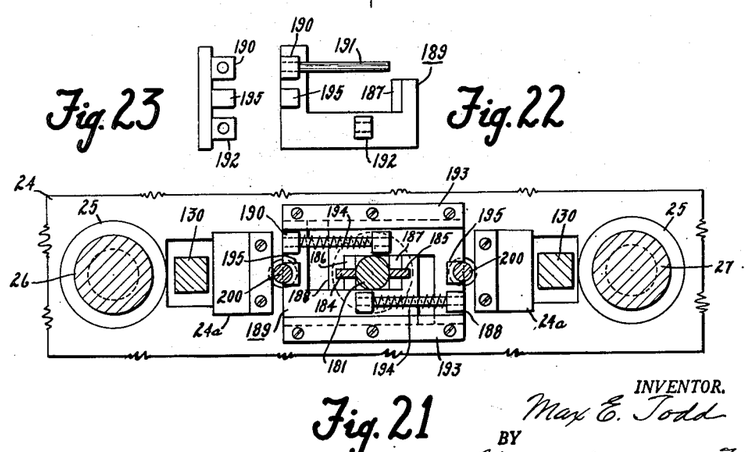
Fig. 21 is a sectional view on line 21—21 of Fig. 20 (left half).
Figs. 22 and 23 are plan and end views, respectively, of a part shown in Fig. 21.

The removal of the work from the workholder is facilitated by the stripping of the workholder 40 from the branches of the hairpins H following the assembling operation shown in the right half of Fig. 17. The stripping is effected by arresting downward movement of the armature shaft S while the workholder 40 is pulled by virtue of the admission of pressure fluid to the upper end of cylinder B. The piston or ram in cylinder B is connected with plate 32 by a piston rod 180 threadedly engaged by a coupling 181 having a flange 182 and passing through a hole in the plate 32 and receiving a nut 183 the tightening of which clamps the plate 32 against the flange 182. Coupling 181 provides cams 184 and 185 engageable respectively with inclined surfaces 186 and 187 provided by plates 188 and 189 respectively. Each of these plates, for example, plate 189 shown in Figs. 22 and 23, has a lug 190 supporting a rod 191 which is received by the hole in a lug 192 of the other plate when the plates are assembled as shown in Fig. 21. Springs 194 which surround the rods 191 urge the plates (guided by rails 193) toward each other so that the inclined surfaces 186 and 187 would engage the piston rod 180 as shown in Fig. 20 (left half). Therefore when the cams 184 and 185 are not forcing the surfaces 186 and 187 apart, lugs 195 of the plates 188 and 189 are located in the path of downward movement of rods 200 which extend through holes in plate 32 and are attached to a plate 201 which carries a button 202 of the proper height for engaging the lower end of the armature shaft S as the workholder 40 is caused to descend by virtue of the admission of pressure fluid to the upper end of cylinder B. When the workholder 40 had previously moved up, plate 32 carried with it the plate 201 and the pins 200 and cams 184 and 185 left the surfaces 186 and 187 of plates 188 and 189 and the springs 194 moved said surfaces together against the piston rod 180 and caused the lugs 195 to be located under the rods 200. Therefore as the plate 32 moves down, the rods 200 descend by gravity until they strike the lugs 195. Further downward movement of the plate 32 causes the shaft S to strike the button 202 as shown in the left half of Fig. 20 thereby arresting movement of the core *ac* while the workholder 40 continues its downward movement. Thus the workholder 40 is stripped from the hairpins H and core *ac* as shown by the right half of Fig. 20. As the cams 184 and 185 of the coupling 181 engage the surfaces 186 and 187 of the plates 188 and 189, the lugs 195 are caused to move from 195 (full-lines) to 195' (dot-dash line) on left half of Fig. 20 and from 195 (full lines) to 195' (dot-dash lines) on the right half of Fig. 20 in which positions the lugs 195 are about to release the pins 200. When the plate 32 is moved down into engagement with the bars 24a on table 24, the cams 184 and 185 will push the surfaces 186 and 187 of plates 188 and 189 so far apart that the lugs 195 clear the ends of pins 200 and the plate 201 and button 202 gravitates to the position shown in Fig. 9.

While the embodiment of the present invention as herein disclosed, constitutes a preferred form, it is to be understood that other forms might be adopted, all coming within the scope of the claims which follow.

What is claimed is as follows:

1. Apparatus for assembling hairpin conductors with a slotted armature core comprising a vertically movable lower support, a workholder, a nesting block carrying hairpins having a yoke and arms in nested relation, a fixed upper support having an opening, means for moving the lower support vertically when supporting the nesting block loaded with hairpins, to cause nested hairpins supported thereby to move through the opening in the upper support, means supported by the upper support for retaining the hairpins in nested relation independently of the nesting block, a manually operated member for rendering said retaining means effective whereby the lower support can be lowered and the nesting block on the workholder can be replaced by a slotted armature core, the elevation of the lower support by the first named means then causing the core on the lower support to be located for reception of the end of the hairpins, a ram for engaging the hairpin yokes, means for causing the ram to move against the yoke of the hairpins and push the ends through the core while the lower support is in upper position, and means responsive to said movement of the ram for effecting retraction of said retaining means.

2. Apparatus according to claim 1 further characterized by the provision of means for latching the lower support in its upper position during operation of the ram to force the hairpins through the armature core.

3. Apparatus according to claim 1 further characterized by the provision of means for latching the nesting block to the workholder on the lower support while the lower support is in positions within a range above its lowermost position.

4. Apparatus according to claim 1 further characterized by the provision of means for stripping the workholder from the assembly of hairpins and core during retraction of the lower support and workholder from the upper support.

MAX E. TODD.

REFERENCES CITED

The following references are of record in the file of this patent:

UNITED STATES PATENTS

| Number | Name | Date |
|---|---|---|
| 1,661,363 | Elsey | Mar. 6, 1928 |
| 1,725,302 | Riddle | Aug. 20, 1929 |
| 1,973,803 | Frauen | Sept. 18, 1934 |
| 2,290,381 | Poole et al. | July 21, 1942 |
| 2,456,646 | Patterson | Dec. 21, 1948 |